United States Patent [19]

Azumatani et al.

[11] Patent Number: 4,969,139
[45] Date of Patent: Nov. 6, 1990

[54] OPTICAL INFORMATION RECORDING AND REPRODUCING APPARATUS HAVING AN IMPROVED DETECTION SYSTEM FOR DETECTING FOULING OF A DISK OR AN INTERNAL OPTICAL SYSTEM

[75] Inventors: Yasushi Azumatani; Isao Satoh, both of Neyagawa; Makoto Ichinose, Sakai; Yoshihisa Fukushima, Osaka; Yuzuru Kuroki, Toyonaka; Yuji Takagi, Kadoma, all of Japan

[73] Assignee: Matsushita Electric Industrial Co., Ltd., Osaka, Japan

[21] Appl. No.: 162,971

[22] Filed: Mar. 2, 1988

[30] Foreign Application Priority Data

Mar. 6, 1987 [JP] Japan .................................. 62-52534

[51] Int. Cl.⁵ .......................... G11B 7/00; G11B 27/36
[52] U.S. Cl. ....................................... 369/54; 369/47; 369/58; 358/342
[58] Field of Search ......................... 369/44–46, 369/47, 48, 54, 58, 124, 44.27, 44.32; 358/342; 360/25, 31

[56] References Cited

U.S. PATENT DOCUMENTS

| | | | |
|---|---|---|---|
| 3,365,706 | 1/1968 | King. | |
| 4,571,716 | 2/1986 | Szerlip | 369/58 X |
| 4,630,269 | 12/1986 | Gershenson et al. | 369/58 X |
| 4,680,744 | 7/1987 | Kanamaru | 369/58 X |
| 4,769,804 | 9/1988 | Satoh et al. | 369/54 X |
| 4,792,933 | 12/1988 | Suzuki | 369/54 X |
| 4,821,254 | 4/1989 | Satoh et al. | 369/54 |
| 4,835,757 | 5/1989 | Abiko | 369/48 X |
| 4,841,512 | 6/1989 | Kubota et al. | 369/58 X |

FOREIGN PATENT DOCUMENTS 0073519 3/1983 European Pat. Off..

OTHER PUBLICATIONS

Patent Abstracts of Japan, vol. 10, No. 162, (p-466), Jun. 10, 1986 & JP-A-61 016033 (Matsushita Denki Sangyo KK) Jan. 24, 1986.
IBM Technical Disclosure Bulletin, vol. 14, No. 4, Sep. 1971, New York U.S.A., I. Student: "Tape Media Statistics", pp. 1320–1321.
Patent Abstracts of Japan, vol. 10, No. 12, (P-421), Jan. 17, 1986, & JP-A-60 167128, (Fujitsu KK) Aug. 30, 1985.
"Error-Correcting Codes," Second Edition, W. Wesley Peterson and E. J. Weldon Jr., The Mit Press, Cambridge, Massachusetts and London, England, 1975.

*Primary Examiner*—Alan Faber
*Assistant Examiner*—W. R. Young
*Attorney, Agent, or Firm*—Stevens, Davis, Miller & Mosher

[57] ABSTRACT

The apparatus includes a one-chip microcontroller, an error flag counter and an error comparison circuit to detect whether or not an optical disk or an internal optical head of the apparatus is fouled. Test data is recorded on a self-diagnostic area of the optical disk when the optical disk loaded in the apparatus is new and has not yet been used, and initial error information detected in the test data reproduced from the self-diagnostic area is registered on an error managing area of the optical disk. When an optical disk which has already been used is loaded, error information detected in the test data recorded on and reproduced from the self-diagnostic area of the optical disk is compared with the initial error information registered in the error managing area of the optical disk. When the comparison shows that the number of data errors is greater than a predetermined reference value, the optical disk or the internal optical head is fouled to such an extent that the recording and reproducing function cannot be satisfactorily performed.

8 Claims, 6 Drawing Sheets

OPTICAL INFORMATION RECORDING AND REPRODUCING APPARATUS HAVING AN IMPROVED DETECTION SYSTEM FOR DETECTING FOULING OF A DISK OR AN INTERNAL OPTICAL SYSTEM

BACKGROUND OF THE INVENTION

1. Field of the Invention

This invention relates to an optical information recording and reproducing apparatus.

2. Description of Related Art

FIG. 6 is a block diagram showing the structure of a prior art optical information recording and reproducing apparatus using an optical disk. Referring to FIG. 6, an optical disk 1 is rotated by a drive motor 2. An optical head 3 writes information on the optical disk 1 by directing a focused laser beam onto the optical disk 1 and reads out the recorded information by detecting a change in the laser beam focused and reflected from the optical disk 1. A laser drive/head amplifier circuit 4 includes a laser drive part for driving the laser source of the optical head 3 and a head amplifier part for detecting a focusing error signal 100, a tracking error signal 101 and a reproduced information signal 102. An actuator for actuating the optical head 3 is driven by a focusing control circuit 5 to which the focusing error signal 100 is applied, so that the laser beam can be accurately focused on a guide track of the optical disk 1. The actuator actuating the optical head 3 is also driven by a tracking control circuit 6 to which the tracking error signal 101 is applied, so that the laser beam can accurately trace the guide track of the optical disk 1. A data modulation/demodulation circuit 7 modulates input data 103 to produce a data signal 104 to be recorded on the optical disk 1 and demodulates the signal 102 reproduced from the optical disk 1 to deliver it as output data 105. A control CPU 8 controls the information recording and reproducing system of the apparatus.

In the prior art optical information recording and reproducing apparatus having a structure as described above, the optical head 3 converges the laser beam and directs the focused laser beam onto a guide track of the optical disk 1 rotating at a predetermined constant high speed. A focusing error signal 100 and a tracking error signal 101 detected by the head amplifier part of the laser drive/head amplifier circuit 4 are applied to the focusing control circuit 5 and the tracking control circuit 6 respectively, and these control circuits 5 and 6 drive the actuator actuating the optical head 3 for carrying out the focusing control and tracking control respectively, so that the focused laser beam can be accurately directed onto the guide track of the optical disk 1.

In the data recording mode, the data modulation/demodulation circuit 7 modulates input data 103 to produce a data signal 104 to be recorded on the optical disk 1.

This signal 104 is applied to the laser drive/head amplifier circuit 4 to modulate the laser beam which has a recordable intensity, and the optical head 3 directs the laser beam onto the optical disk 1 to record the data.

On the other hand, in the data reproduction mode, the laser beam, whose level is too low to record any data, is directed from the optical head 3 onto the optical disk 1. The laser drive/head amplifier circuit 4 receives the reflection of the focused laser beam from the optical disk 1 to reproduce the signal 102, and this reproduced signal 102 is demodulated in the data modulation/demodulation circuit 7 to appear as output data 105.

However, when the optical disk 1 in the prior art optical information recording and reproducing apparatus having a structure as described above is continuously used for a long period of time and rotated at high speed, the optical disk 1, whose basic material is an electrical insulating resin or glass, becomes electrostatically charged, and dust floating in the ambient air is attracted to the surface of the optical disk 1. Also, dust intruding into the apparatus attaches to parts such as optical disk 1 and the lens. Because the attracted dust absorbs and scatters the laser beam, the recording and reproducing power of the laser beam is lowered by about several-ten percents. As a result, the recording and reproducing power of the laser beam to be directed onto the recording layer deposited on the guide tracks of the optical disk 1 is greatly diminished, and signals cannot be satisfactorily recorded on and reproduced from the optical disk 1.

This gives rise to a decreased amplitude of the reproduced signal and corresponding degradation of the bit error rate. Further, because the reduced recording power of the laser beam results in corresponding insufficient formation of recording pits, the prior art optical information recording and reproducing apparatus has had such a disadvantage that the progressive deterioration of the recording pits with time leads to a shortened useful service life of the optical disk.

SUMMARY OF THE INVENTION

It is an object of the present invention to provide an optical information recording and reproducing apparatus in which means are provided so as to detect whether or not an optical disk or an internal optical system of the apparatus is fouled with dust.

In accordance with the present invention, there is provided an optical information recording and reproducing apparatus comprising recording and reproducing means for recording and reproducing information on and from an optical disk loaded in the apparatus; status-of-use checking means for checking whether the loaded optical disk is new and has not yet been used or has already been used; error detecting means recording and reproducing test data on and from a self-diagnostic area of the optical disk for detecting error information from the reproduced test data; error information recording means for registering, on an error managing region of the optical disk, the error information detected when the self-diagnostic area of the optical disk is first used; and error comparing means for comparing the error information detected by the error detecting means with the initial error information reproduced from the error managing area of the optical disk.

In the optical information recording and reproducing apparatus of the present invention, whether an optical disk loaded in the apparatus is new and has not yet been used or has already been used is checked. When the result of checking proves that the loaded optical disk has not yet been used, test data is recorded on and reproduced from the self-diagnostic area of the optical disk, and initial error information detected in the reproduced test data is registered on the error managing area of the optical disk. On the other hand, when the result of checking proves that the loaded optical disk has already been used, error information detected in the test data recorded in and then reproduced from the self-diagnostic area is compared with the initial error information reproduced from the error managing area. When the result of comparison proves that the number of detected errors is more than that detected at the beginning of the use of the optical disk, fouling of the optical disk or the internal optical system is detected.

DESCRIPTION OF THE PREFERRED EMBODIMENTS

Figure 1:
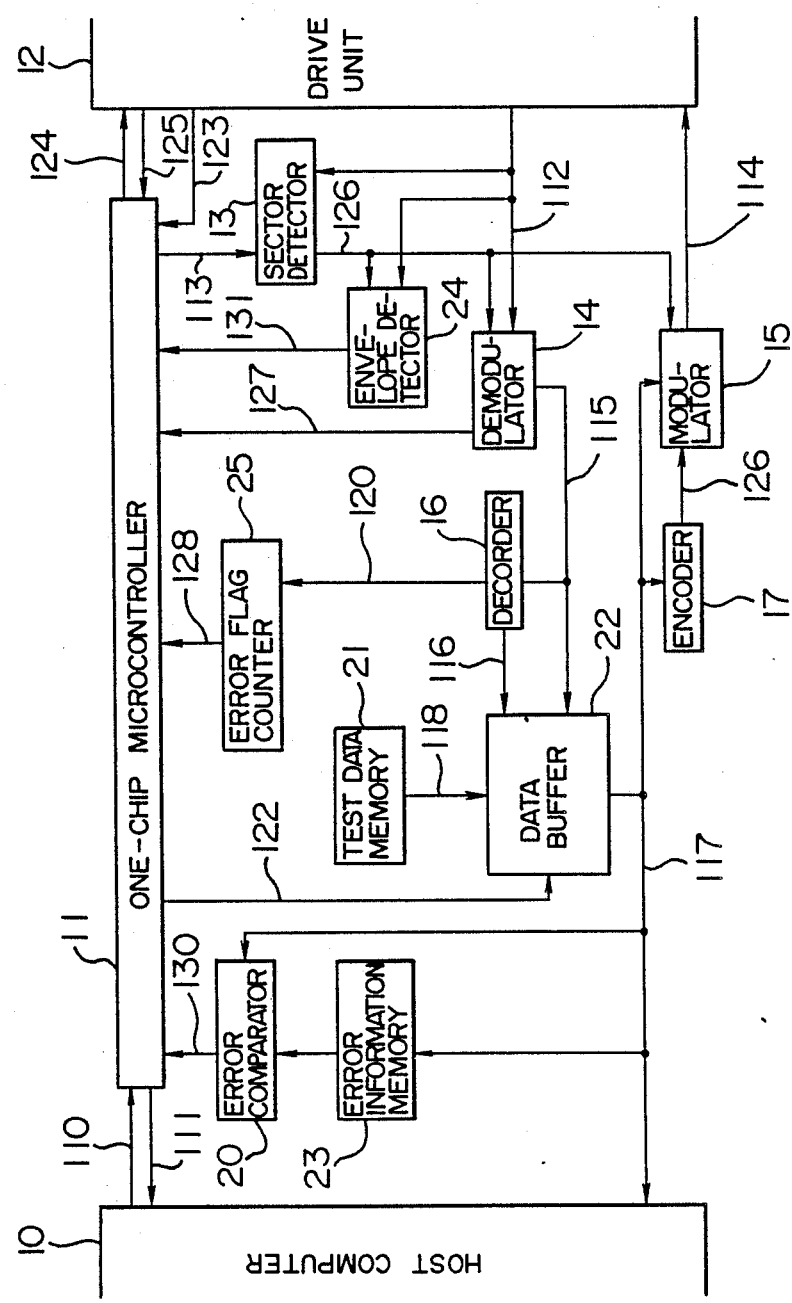
FIG. 1 is a block diagram showing the structure of a first embodiment of the optical information recording and reproducing apparatus of the present invention.

FIG. 1 is a block diagram showing the structure of a first embodiment of the present invention. Referring to FIG. 1, a one-chip microcontroller 11 controls the overall apparatus in response to a device command 110 transmitted from a host computer 10. A drive unit 12 sends out signals 112 reproduced from sectors of an optical disk (not shown) by an optical head (not shown). The one-chip microcontroller 11 instructs a target sector address 113, and a sector detection circuit 13 detects the instructed target sector address 113 among the reproduced signals 112 sent out from the drive unit 12. An envelope detection circuit 24 detects an envelope signal representing data contained in the signal 112 reproduced from the target sector of the optical disk. A demodulation circuit 14 demodulates the data contained in the reproduced signal 112 and applies its output signal 115 representing the demodulated data to a decoder 16 and a data buffer 22. A modulation circuit 15 modulates data and applies its output signal 114 representing the modulated data to be recorded on the optical disk to the drive unit 12. The decoder 16 detects and corrects errors that may be included in the demodulated data 115, and, when errors are detected, applies error flags 120 corresponding to the number of detected errors to an error flag counter 25 which counts the number of the error flags 120. An encoder 17 adds an error detection and correction code to buffer data 117 derived from the data buffer 22. An error comparison circuit 20 compares error information data 121 read out from an error information memory 23 with error total-number data 122 supplied from the one-chip microcontroller 11.

Figure 2:
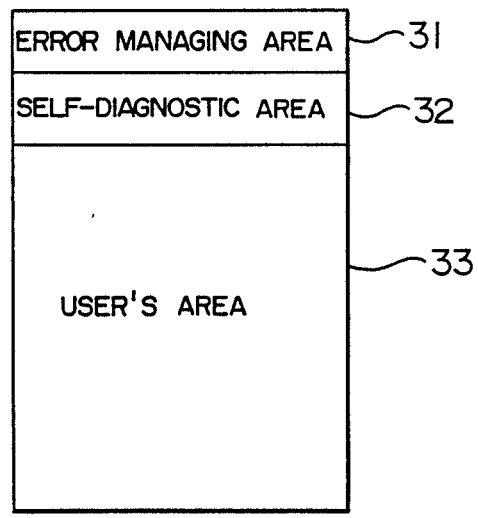
FIG. 2 shows an arrangement of various areas of an optical disk which is preferably used in the apparatus of the present invention.

FIG. 2 shows an arrangement of various areas of an optical disk preferably used in the apparatus of the present invention. Referring to FIG. 2, the optical disk includes a self-diagnostic area 32 for recording test data to be reproduced so as to detect error information, an error managing area 31 for registering initial error information detected as a result of the reproduction of the test data recorded on the self-diagnostic area 32, and a user's area 33 for recording user's data thereon.

Figure 3:
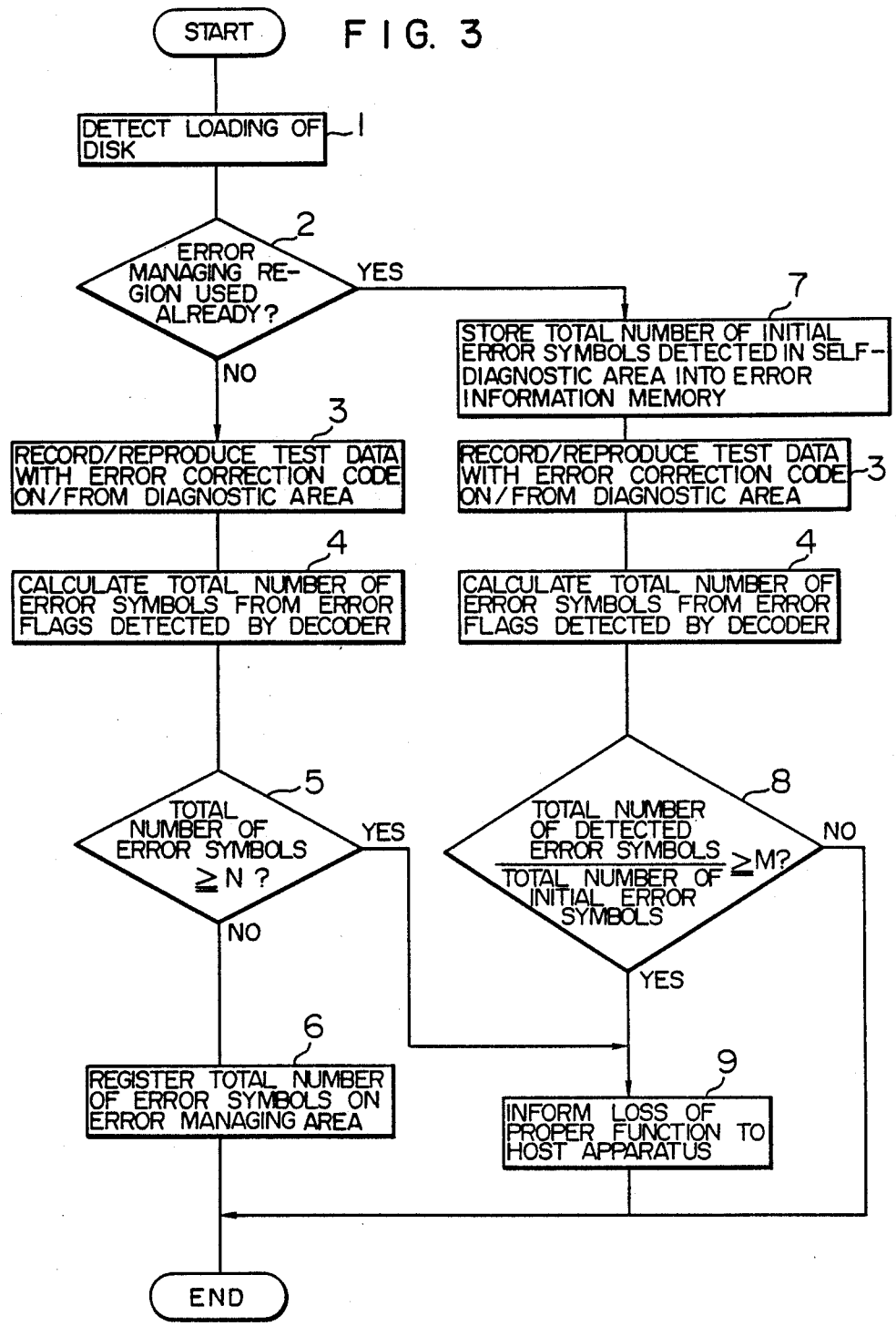
FIG. 3 is a flow chart illustrating the steps of self-diagnostic operation in the first embodiment shown in FIG. 1.

The flow chart of FIG. 3 illustrates the steps of self-diagnostic operation carried out in the first embodiment of the optical information recording and reproducing apparatus having a structure as described above when an optical disk having various areas as shown in FIG. 2 is newly loaded.

Step 1

A drive interrupt signal 123 is applied to the one-chip microcontroller 11 from the drive unit 12. In response to this drive interrupt signal 123, the one-chip microcontroller 11 sends out to the drive unit 12 a drive command 124 requesting the status of the disk drive in the drive unit 12. In response to the drive command 124, the drive unit 12 applies a drive status signal 125 to the one-chip microcontroller 11, and, by checking this drive status signal 125, the one-chip microcontroller 11 detects that an optical disk is newly loaded in the apparatus.

Step 2

As a target sector address 113, the one-chip microcontroller 11 selects a sector address in the error managing area 31 of the optical disk and applies such an address signal 113 to the sector detection circuit 13. In response to this address signal 113, the sector detection circuit 13 detects sector address information contained in the signal 112 reproduced from the selected sector and applied from the drive unit 12, so as to detect coincidence between the target sector address 113 and the sector address information. When the target sector is detected as a result of the coincidence detection, the sector detection circuit 13 generates a sector detection signal 126 so as to activate the envelope detection circuit 24 and the demodulation circuit 14.

When the envelope detection circuit 24 detects an envelope signal of representing data contained in the reproduced signal 112, it applies an envelope detection signal 131 to the one-chip microcontroller 11. The one-chip microcontroller 11 checks to determine whether or not the envelope detection signal 131 is detected within a rotational delay time corresponding to one sector. When the result of checking proves that the envelope detection signal 131 is not detected because the optical disk is new and has not been used yet, step 2 is followed by step 3. On the other hand, when the result of checking proves that the optical disk has been used already, step 2 is followed by step 7.

Step 3

As the target sector address 113, the one-chip microcontroller 11 selects a sector address in the self-diagnostic area 32 of the optical disk and applies such an address signal 113 to the sector detection circuit 13. In response to the address signal 113, the sector detection circuit 13 detects sector address information contained in the signal 112 reproduced from the selected sector and applied from the drive unit 12, so as to detect coincidence between the target sector address 113 and the sector address information. When the target sector is detected as a result of the coincidence detection, the sector detection circuit 13 generates the sector detection signal 126 so as to activate the modulation circuit 15.

First, test data 118 read out from a test data memory 21 is supplied to the data buffer 22 to appear as buffer data 117 from the data buffer 22. The encoder 17 adds an error detection and correction code to the buffer data 117 to provide coded data 129 which is supplied to the modulation circuit 15. The modulation circuit 15 modulates the coded data 129 to produce a signal 114 to be recorded, and this signal 114 is applied to the drive unit 12 to be recorded on the self-diagnostic area 32 of the optical disk.

The one-chip microcontroller 11 selects a sector address in the self-diagnostic area of the optical disk as the target sector address 113 again and applies such an address signal 113 to the sector detection circuit 13. The sector detection circuit 13 detects sector address information contained in the signal 112 reproduced from the selected sector and applied from the drive unit 12, so as to detect coincidence between the target sector address 113 and the sector address information. When the target sector is detected as a result of the coincidence detection, the sector detection circuit 13 generates the sector detection signal 126 so as to activate the demodulation circuit 14.

The demodulation circuit 14 demodulates the reproduced signal 112 applied from the drive unit 12 while discriminating data contained in the reproduced signal 112 and supplies the demodulated data 115 to the decoder 16.

Step 4

The decoder 16 detects and corrects errors included in the demodulated data 115. That is, the decoder 16 carries out error correction by grouping errors into an error syndrome, calculating the number of error symbols for each individual code word, and finding error symbol locations and error symbol values. For the purpose of this manner of error detection and correction, a BCH code is used. Such a method of error detection and correction by the use of the BCH code is described in detail in chapter 9 of a book entitled "ERROR-CORRECTING CODES", SECOND EDITION (W. Wesley Peterson and E. J. Weldon Jr., The MIT PRESS, CAMBRIDGE MASSACHUSETTS AND LONDON, ENGLAND, 1975).

In the course of error detection and correction the decoder 16 detects the number of error symbols for a given code word and sends out an error flag 120 representing the number of error symbols to the error flag counter 25. The error flag counter 25 sends out the count of the error flags 120 representing the same number to the one-chip microcontroller 11 as error data 128. In the one-chip microcontroller 11, the count of the error flags 120 representing the same number is multiplied by the number of the error symbols represented by that error flag 120 to calculate the total number of the error symbols.

Suppose, for example, that the decoder 16 can detect a maximum of three error symbols for each individual code word, and there are $L_1$, $L_2$ and $L_3$ code words having one, two and three error symbols respectively. When the decoder 17 detects one, two or three error symbols in each individual code word, an error flag 120 indicating one, two or three errors is sent out from the decoder 16 to the error flag counter 25. Thus, the one-chip microcontroller 11 receiving the error data 128 from the error flag counter 25 is informed that there are $L_1$, $L_2$ and $L_3$ code words having one error symbol, two error symbols and three error symbols respectively. The one-chip microcontroller 11 calculates the total number of error symbols according to the following equation:

$$\text{(Total number of error sumbols)} = L_1 \times 1 + L_2 \times 2 + L_3 \times 3$$

Step 5

When the one-chip microcontroller 11 finds that the total number of error symbols is equal to or larger than a predetermined reference value N, it decides that the optical disk or the internal optical system of the apparatus is fouled to such an extent that the optical information recording and reproducing function cannot be normally performed. In this case, step 5 is followed by step 9.

Step 6

When the total number of error symbols is smaller than the predetermined reference value N, error total-number data 122 obtained by formatting the total number of error symbols is sent out to the data buffer 22 from the one-chip microcontroller 11.

Further, the one-chip microcontroller 11 selects a sector address in the error managing area 31 of the optical disk as the target sector address 113 and applies such an address signal 113 to the sector detection circuit 13. The sector detection circuit 13 detects sector address information contained in the signal 112 reproduced from the selected sector and applied from the drive unit 12, so as to detect coincidence between the target sector address and the sector address information. When the target sector is detected as a result of the coincidence detection, the sector detection circuit 25 generates the sector detection signal 126 for activating the modulation circuit 15.

The error total-number data 122 supplied to the data buffer 22 from the one-chip microcontroller 11 appears as buffer data 117 from the data buffer 22, and the encoder 17 adds the error detection and correction code to the buffer data 117 to provide coded data 129 which is supplied to the modulation circuit 15. The modulation circuit 15 modulates the coded data 129 to produce a signal 114 to be recorded, and this signal 114 is applied to the drive unit 12. Thus, the total number of initial error symbols detected on the self-diagnostic area 32 is now recorded on the error managing area 31 of the optical disk, thereby completing execution of the self-diagnostic operation.

Step 7

This step is executed when the result of checking in the step 2 proves that the optical disk is not new and has already been used.

The demodulation circuit 14 demodulates the reproduced signal 112 applied from the drive unit 12 while discriminating data contained in the reproduced signal 112 and supplies the demodulated data 115 to the decoder 16. The decoder 16 detects and corrects errors included in the demodulated data 115 and supplies reproduced data 116 to the data buffer 22. Further, the data representing the total number of initial error symbols detected on the self-diagnostic area 32 of the optical disk by recording and reproducing test data thereon and derived from the data buffer 22 as buffer data 117 is stored in the error information memory 23 under control of the one-chip microcontroller 11.

Step 8

The error total-number data 122 obtained by formatting the total number of error symbols is sent out to the data buffer 22 from the one-chip microcontroller 11.

The error comparison circuit 20 compares the buffer data 117 derived from the data buffer 22 with the error information data 121 read out from the error information memory 23 to calculate the ratio between the data 117 and 121. When the calculated ratio is equal to or larger than a predetermined reference value M, the optical disk or the internal optical system of the apparatus is fouled, and the optical information recording and reproducing function cannot be normally performed. A signal 130 indicating the impossibility of normally performing the recording and reproducing function is applied from the error comparison circuit 20 to the one-chip microcontroller 11. On the other hand, when the ratio described above is smaller than the predetermined reference value M, the optical information recording and reproducing function is normal, and the execution of the self-diagnostic operation is completed.

Step 9

When, in response to the device command 110 transmitted from the host computer 10, the one-chip microcontroller 11 applies sense information 111 to the host computer 10 to inform the host that the optical disk or the internal optical system is fouled, and the optical information recording and reproducing function cannot be normally performed, the execution of the self-diagnostic operation is completed.

In step 2, the envelope detection circuit 24 can detect the envelope signal by detecting that a retriggerable monostable multivibrator, to which the binary reproduced signal 112 is applied as an input, generates an output which becomes continuously active by a number of times which is a predetermined multiple of the time constant T of the multivibrator. The fact that the output of the multivibrator becomes continuously active can be confirmed by detecting that the output becomes active by k times as a result of sampling the output by n times. Further, although a determination is made as to whether or not the optical disk has already been used is made on the basis of the envelope detection signal 131, it can be decided on the basis of a busy signal 127 generated from the demodulation circuit 14 when the demodulation circuit 14 is activated by the signal 126 produced on the basis of the signal 112 reproduced from the recorded sector.

Further, those skilled in the art will readily understand that the host computer 11 can perform the functions of the error flag counter 25 and error comparison circuit 20 employed in the first embodiment.

It will be seen from the above description that, in the first embodiment of the optical information recording and reproducing apparatus of the present invention, the error flag counter 25 counts the number of error flags 120 detected by the decoder 16 when an optical disk which is new and has not yet been used commenses use for optical information recording and reproduction and also during the use of the optical disk for the same purpose. The total number of the error symbols counted in the latter case is compared in the error comparison circuit 20 with that counted in the former case. When an increase in the data errors is detected as a result of the error flag comparison in the error comparison circuit 20, the one-chip microcontroller 11 can detect that the optical information recording and reproducing function cannot be normally performed due to, for example, fouling of the optical disk or the internal optical system of the apparatus.

Figure 4:
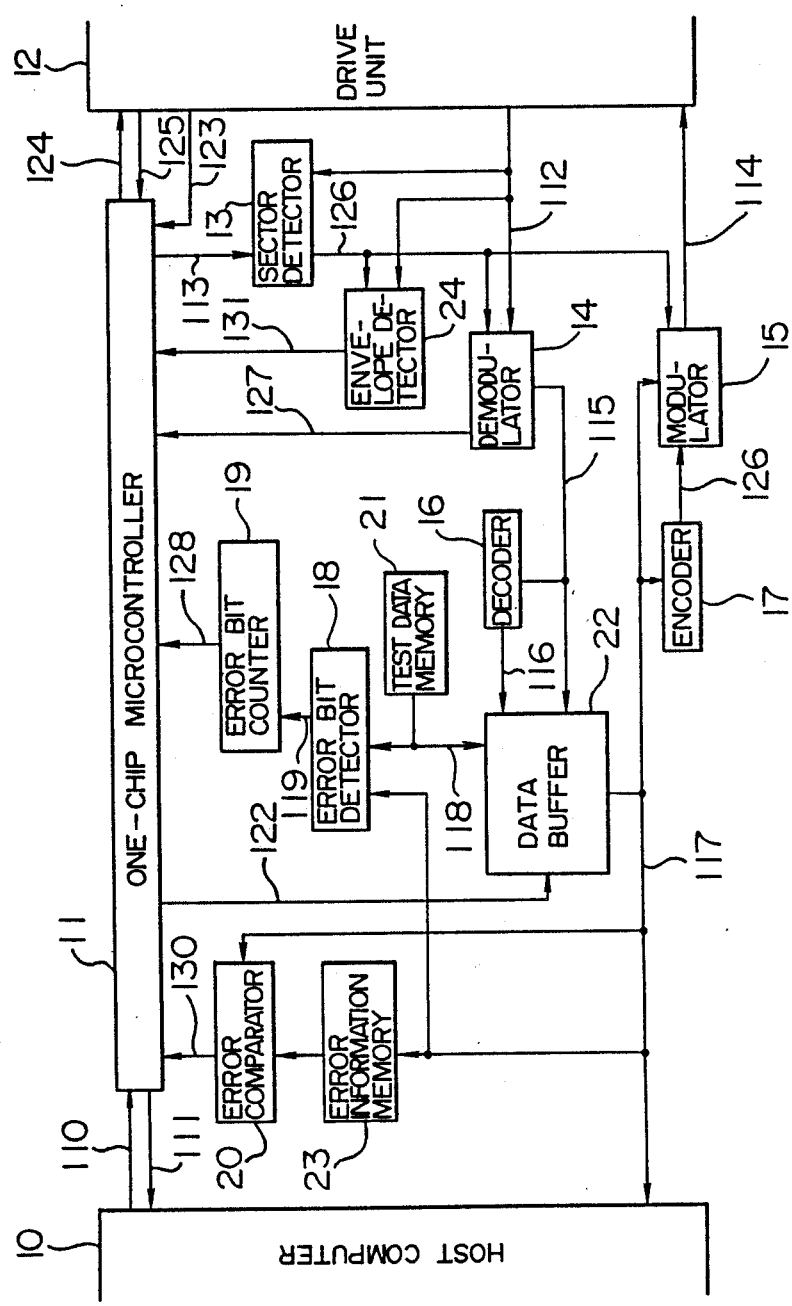
FIG. 4 is a block diagram showing the structure of a second embodiment of the optical information recording and reproducing apparatus of the present invention.

FIG. 4 is a block diagram showing the structure of a second embodiment of the optical information recording and reproducing apparatus of the present invention. In FIG. 4, the reference numerals 10 to 17, 24, 110 to 118 and 121 to 131 designate the same parts and signals as those used in the first embodiment shown in FIG. 1. Referring to FIG. 4, an error bit detection circuit 18 compares buffer data 117 derived from the data buffer 22 with test data 118 read out from the test data memory 21 to detect error information. An error bit counter 19 counts error bits represented by an output signal 119 of the error bit detection circuit 18.

The arrangement of various areas of an optical disk preferably used in the second embodiment of the present invention is the same as that of the optical disk shown in FIG. 2.

The self-diagnostic operation of the second embodiment of the optical information recording and reproducing apparatus having the illustrated structure, when an optical disk is newly loaded, will be described with reference to a flow chart of FIG. 5.

Figure 5:
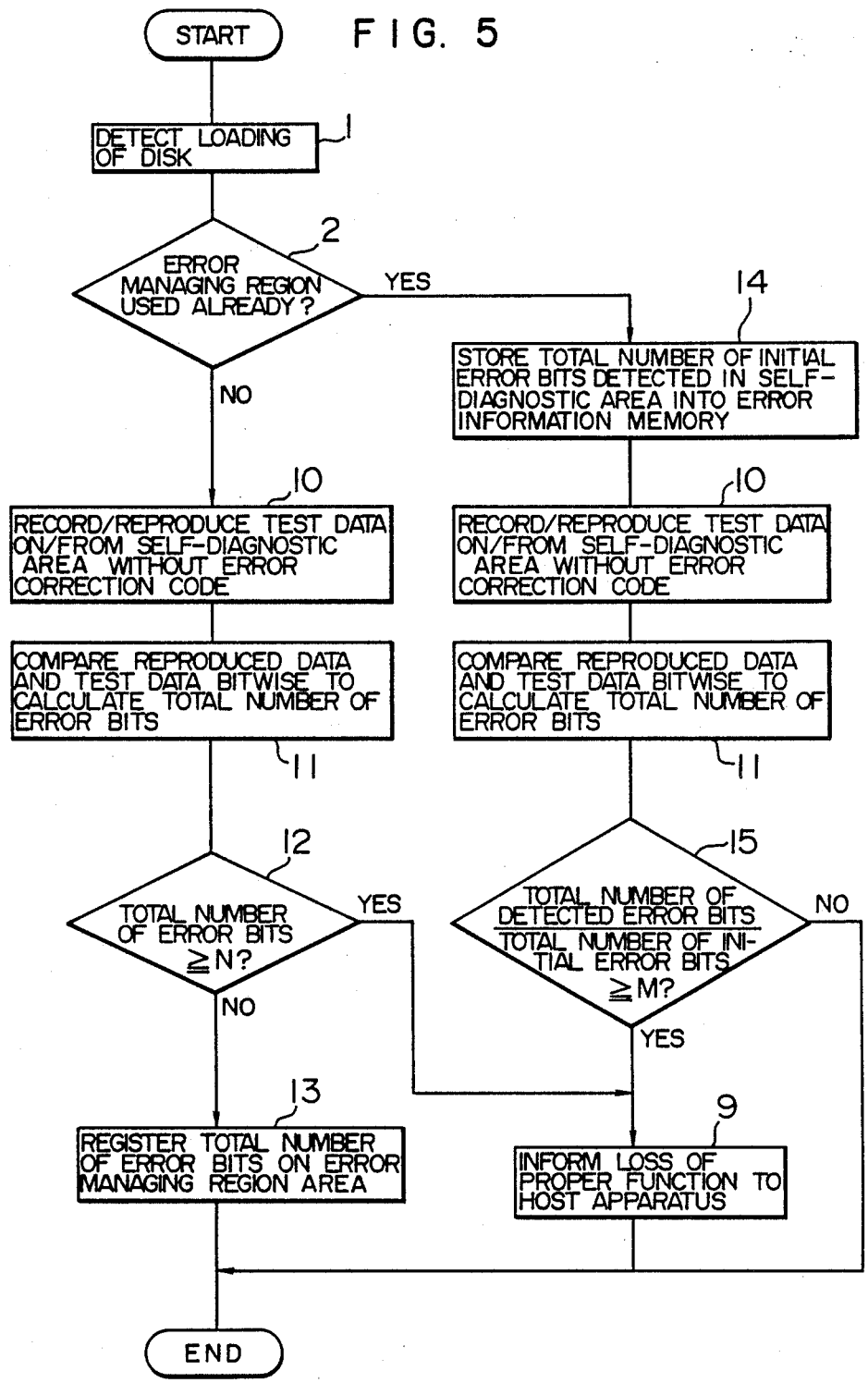
FIG. 5 is a flow chart illustrating the steps of self-diagnostic operation in the second embodiment shown in FIG. 4.
Figure 6:
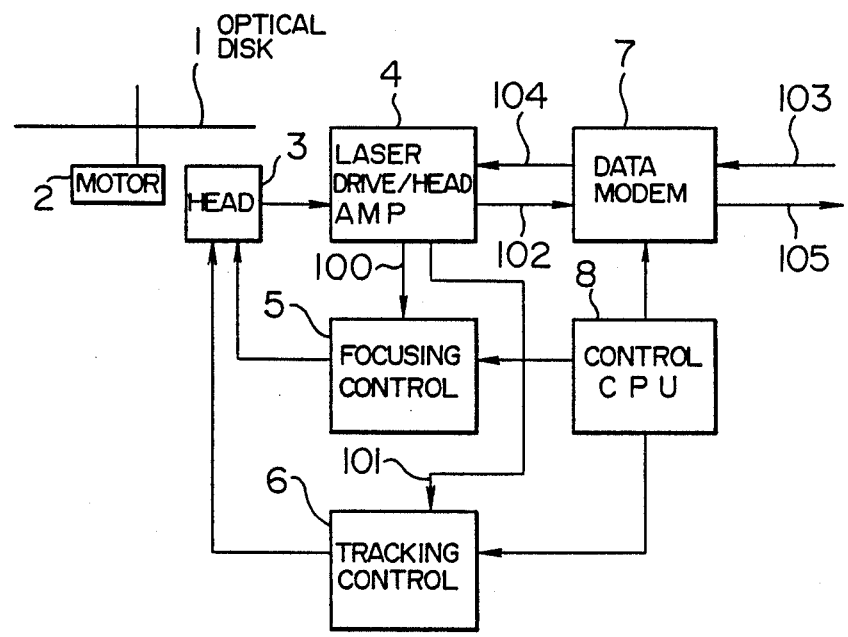
FIG. 6 is a block diagram showing the structure of a prior art optical information recording and reproducing apparatus.

In the following description, operations in steps 1, 2 and 9 in FIG. 5 are the same as those in steps 1, 2 and 9 respectively in FIG. 3, and operations in steps 12 to 15 in FIG. 5 are also the same as those in steps 5 to 8 respectively in FIG. 3, except that the term "error symbol" is replaced by the term "error bit". Therefore, those steps need not be described again, and operations in steps 10 and 11 will only be described herein.

Step 10

As in case of the step 3, test data is recorded on and reproduced from the self-diagnostic area 32 of the optical disk. However, step 10 differs from step 3 in that, buffer data 117 is directly supplied to the modulation circuit 15 without being passed through the encoder 17, whereas coded data 129 provided by adding the error detection and correction code to test data 118 by the encoder 17 is supplied to the modulation circuit 15 in step 3.

Step 11

Error information is detected by the error bit detection circuit 18. First, the demodulation circuit 14 demodulates a reproduced signal 112 applied from the drive unit 12 while discriminating data contained in the signal 112, and the demodulated data 115 from the demodulation circuit 14 is directly supplied to the data buffer 22 without being passed through the decoder 16. In the error bit detection circuit 18, the buffer data 117 derived from the data buffer 22 is compared bit-to-bit with the test data 118 read out from the test data memory 21, and, each time non-coincidence therebetween is detected, an error bit detection signal 119 is applied to the error bit counter 19. The data representing the number of error bit detection signals 119 counted by the error bit counter 19 is supplied to the one-chip microcontroller 11 as error data 128. The value of this error data 128 represents the total number of occurred error bits.

The error bit detecting operation of the error bit detection circuit 18 and the error bit counting operation of the error bit counter 19 in the second embodiment can be easily realized by means of software prepared in the one-chip microcontroller 11 to dispense with the provision of such hardware parts. Also, the operations of the error bit detection circuit 18, error bit counter 19 and error comparison circuit 20 can be easily done by the host computer 10.

Further, the operation of the error comparison circuit 20 in each of the first and second embodiments may also be easily realized by means of software prepared in the one-chip microcontroller 11. Further, although the test data 118 recorded on the optical disk so as to obtain error information is stored in the test data memory 21, the test data 118 may be supplied from the host computer 10.

In the second embodiment of the optical information recording and reproducing apparatus having features as described above, the error bit detection circuit 18 detects error bits included in demodulated data not subjected to error correction, and the error bit counter 19 counts the total number of such error bits. The total number of error bits counted when use is commenced of an optical disk, which is new and has not yet been used, for the optical information recording and reproducing purpose and that counted during the use of the optical disk for the same purpose are compared in the error comparison circuit 20. When an increase in the data errors is detected as a result of the error bit comparison in the error comparison circuit 20, the one-chip microcontroller 11 can detect that the optical information recording and reproducing function cannot be normally performed due to, for example, fouling of the optical disk or the internal optical system of the apparatus.

In the aforementioned embodiments of the present invention, the self-diagnostic operation for detecting fouling of an optical disk or the internal optical system of the apparatus starts when the optical disk is loaded in position in the apparatus. However, this self-diagnostic operation may start when the power supply for the apparatus is turned on or when a device command 110 requesting diagnosis is transmitted from the host computer 10. Therefore, the self-diagnostic operation is also carried out even in an optical information recording and reproducing apparatus of the type in which an optical disk is completely enclosed.

It will be understood from the foregoing detailed description that the present invention provides an optical information recording and reproducing apparatus in which fouling of an optical disk or its internal optical system is detected by comparing the total number of errors detected when use is commenced of the optical disk, which is new and has not yet been used, for optical information recording and reproduction with that detected during the use of the optical disk, thereby detecting an increase in errors included in recorded and reproduced test data. Therefore, fouling of the optical disk and the internal optical system of the apparatus can be detected with high reliability, and the apparatus has great practical advantages and effects.

What is claimed is:

1. An optical information recording and reproducing apparatus for recording and reproducing information on and from an optical disk having a self-diagnostic area usable in diagnosing recording and reproducing operation and an error managing area for registering error information of test data recorded on and reproduced from said self-diagnostic area before a first use of the optical disk for recording and reproducing, said apparatus comprising:

recording and reproducing means for recording and reproducing information on and from said optical disk;

status-of-use checking means for checking whether said optical disk is new and has not yet been used or said optical disk has already been used;

error detecting means for recording and reproducing test data on and from said self-diagnostic area of said optical disk and for detecting the number of errors included in the test data;

error information recording means for recording and reproducing, when said status-of-use checking means decides that said optical disk is new and has not yet been used or is not new and has been used, respectively, the number of errors detected by said error detecting means on and from said error managing area of said optical disk; and error comparing means for comparing, when said status-of-use checking means decides that said optical disk has already been used, the number of errors detected by said error detecting means with the number of errors reproduced from said error managing area of said optical disk, to thereby detect the number of errors which has been newly produced; and fouled condition determination means for determining that said optical disk or an internal optical system of said recording and reproducing means is fouled when said number of errors, which have been newly produced, detected by said error comparing means is greater than or equal to a predetermined reference value.

2. An optical information recording and reproducing apparatus according to claim 1, wherein said status-of-use checking means comprises means for deciding whether or not said optical disk has already been used by determining the presence or absence of an envelope signal produced from a signal reproduced from said error managing area of said optical disk.

3. An optical information recording and reproducing apparatus according to claim 1, wherein said status-of-use checking means comprises means for deciding whether or not said optical disk has already been used by detecting starting of a demodulating operation on the error information reproduced from said error managing area of said optical disk or confirming reproduction of the error information read out from said error managing area.

4. An optical information recording and reproducing apparatus according to claim 1, wherein said error detecting means comprises means for adding an error detection and correction code to test data, and, after recording and reproducing the test data on and from said self-diagnostic area of said optical disk, for detecting an error syndrome on the basis of said error detection and correction code, thereby producing the number of errors.

5. An optical information recording and reproducing apparatus according to claim 1, wherein said error detecting means includes means for recording test data on said self-diagnostic area of said optical disk, and, after reproducing the test data, for comparing the recorded test data and the reproduced test data in a 1:1 relation to detect whether or not they coincide with each other.

6. An optical information recording and reproducing apparatus according to claim 1, further comprising means for activating said status-of-use checking means responsive to an optical disk being newly loaded in said optical information recording and reproducing apparatus.

7. An optical information recording and reproducing apparatus according to claim 1, further comprising means for activating said status-of-use checking means responsive to at least one of turn-on of a power supply which is adapted to supply power to said optical information recording and reproducing apparatus and a status of use demand from a host computer.

8. An optical information recording and reproducing apparatus according to claim 1, wherein said error information recording means includes means for recording the number of errors on said error managing area of said optical disk only when the number of errors is less than a predetermined reference value.

* * * * *